United States Patent [19]

Leeper et al.

[11] 4,293,020

[45] Oct. 6, 1981

[54] TIRE CHANGING APPARATUS

[75] Inventors: Charles G. Leeper, Antioch; John F. Wood, Nashville, both of Tenn.

[73] Assignee: Hennessy Industries, Inc., Elk Grove Village, Ill.

[21] Appl. No.: 940,831

[22] Filed: Sep. 7, 1978

[51] Int. Cl.³ .............................................. B60C 25/06
[52] U.S. Cl. .................................... 157/1.28; 157/19
[58] Field of Search .................... 157/1.17, 1.22, 1.26, 157/1.28; 144/288 A

[56] References Cited

U.S. PATENT DOCUMENTS

| | | | |
|---|---|---|---|
| 2,534,950 | 12/1950 | Butterfield et al. | 157/1.28 |
| 2,812,788 | 11/1957 | Athmann | 144/288 A |
| 2,903,049 | 9/1959 | Carlson | 157/1.28 X |
| 2,920,664 | 1/1960 | Lomen et al. | 144/288 A |
| 2,948,314 | 8/1960 | Bishman | 144/288 A |
| 3,168,130 | 2/1965 | Turpin | 157/1.28 |
| 3,815,654 | 6/1974 | Maddox | 157/1.26 |
| 3,865,172 | 2/1975 | Branick | 157/1.28 X |
| 3,905,413 | 9/1975 | Myers | 157/1.24 |

Primary Examiner—James G. Smith
Attorney, Agent, or Firm—Wegner, Stellman, McCord, Wiles & Wood

[57] ABSTRACT

A tire changer including a base having a lower extremity to support the base on an underlying surface, a tabletop having wheel grippers, a pivot mounting the tabletop on the base for pivotal movement about a generally horizontal axis between a generally horizontal, tire changing position and a generally vertical, wheel loading and unloading position whereat the wheel gripper is in sufficiently close proximity to the underlying surface supporting the base so as to be engageable with and securable to an upright wheel and tire on an underlying surface, a motor for selectively pivoting the tabletop between the two positions thereof, a bead loosening device connected to the base and defining a tire and wheel receiving space for receipt of an upright tire and wheel, the bead loosening device including at least one bead loosening shoe generally horizontally movable across the space in a direction generally transverse to the horizontal axis.

11 Claims, 6 Drawing Figures

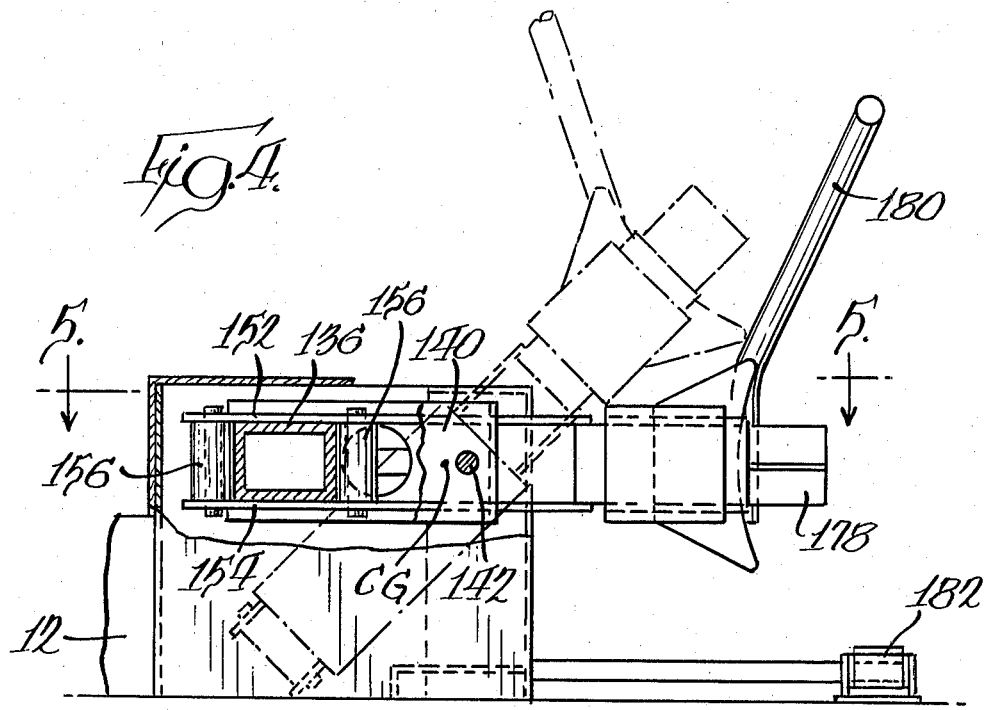
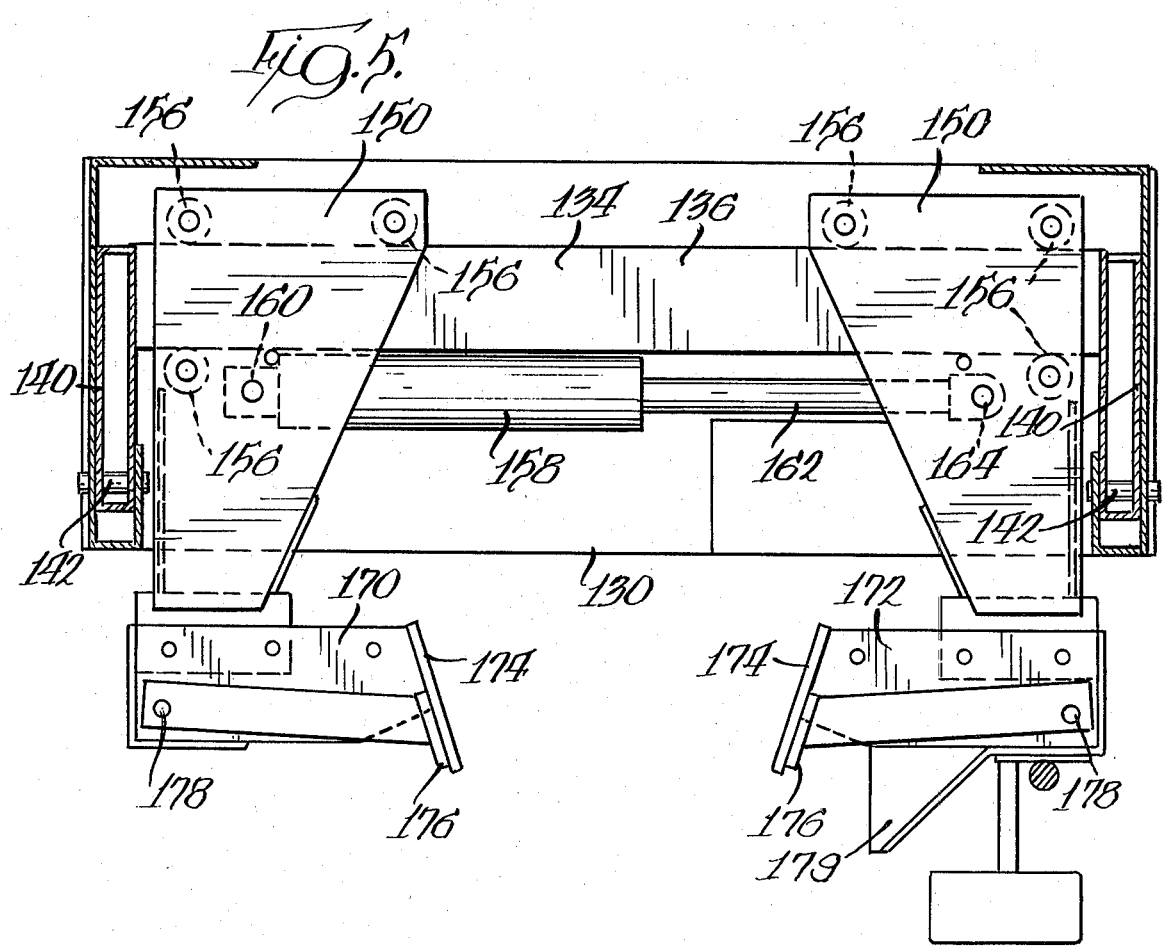

TIRE CHANGING APPARATUS

BACKGROUND OF THE INVENTION

This invention relates to a tire changing apparatus, and more specifically, to a tire changing apparatus particularly suited for use in the changing of relatively heavy tire ad wheel combinations as are typically found on trucks.

Many tire changing machines commonly in use today are quite adequate for their intended purpose when used in changing various wheel and tire combinations commonly employed in automobiles. Typically, they include a base mounting a tabletop or tire receiving surface in an elevated position, usually 30 or more inches above the underlying surface supporting the machine. However, wheel and tire combinations employed on a large variety of trucks may be considerably larger than those used with automobiles. Thus, even if the tire changing apparatus is capable of performing tire changing operations on the larger truck tires, the operator of the changer will be faced with considerable difficulty in elevating the wheel and tire combination sufficiently to place it on the tabletop for servicing purposes due to the considerably increased weight of the larger truck tire and wheel combinations.

As a consequence, the operator will be quickly fatigued and considerable inefficiency will enter into the changing process.

Thus, there is a real need for a tire changing apparatus which eliminates or otherwise minimizes the amount of physical effort required by an operator thereof and yet which still allows the servicing of tires of relatively large size in an efficient and expeditious manner.

SUMMARY OF THE INVENTION

It is the principal object of the invention to provide a new and improved tire changing apparatus. More specifically, it is an object of the invention to provide a tire changing apparatus which is capable of changing relatively large and heavy wheel and tire combinations with a minimum of physical effort required on the part of the operator.

According to one facet of the invention, there is provided a tire changer including a base having a lower extremity to support the base on an underlying surface. There is also provided a tabletop having wheel securing means thereon. Means mount the tabletop on the base for pivotal movement about a generally horizontal axis between a generally horizontal, tire changing position and a generally vertical, wheel loading and unloading position whereat the securing means is in sufficiently close proximity to the underlying surface supporting the base so as to be engageable with and securable to an upright wheel and tire on the underlying surface. Means are provided for selectively pivoting the tabletop between the two positions.

As a consequence of the foregoing construction, a wheel and tire need only be rolled into proximity to the tabletop when in a vertical position, secured thereto and the tabletop pivoted to the tire changing position. The only effort required on the part of the operator is that of rolling the tire along the underlying surface to the location of the tire changer.

According to another facet of the invention, there is provided a bead loosener for loosening a tire from a wheel including a base. A U-shaped support element having a straight bight and generally parallel legs extending therefrom is also provided. Means pivot the legs to the base for rotation of the U-shaped member about a generally horizontal axis. A pair of carriages are mounted on the bight for slidable movement thereon towards and away from each other. A pair of bead loosening shoes, one on each carriage, are provided and are movable with the respective carriages towards and away from each other. A reciprocal motor extends between and interconnects the carriages and is operative to provide relative movement between the carriages for bead loosening purposes.

The operator of the bead loosener need only roll the tire, in an upright position, to a location between the bead loosening shoes to position the same for bead loosening.

In a highly preferred embodiment of the invention, a tire changer and a bead loosener share a common base with the path of movement of the bead loosening shoes being transverse to the horizontal axis of rotation of the tabletop on the base so that the wheel and tire can be rolled between the two with little or no need for the operator to additionally revolve the tire about a diameter thereof when moving from one position to the other.

Other objects and advantages will become apparent from the following specification taken in connection with the accompanying drawings.

DESCRIPTION OF THE DRAWINGS

FIG. 4 is a side elevation of a bead loosener employed in the invention with parts broken away for clarity;

FIG. 5 is a horizontal section taken approximately along the line 5—5 of FIG. 4;

DESCRIPTION OF THE PREFERRED EMBODIMENT

Figure 1:
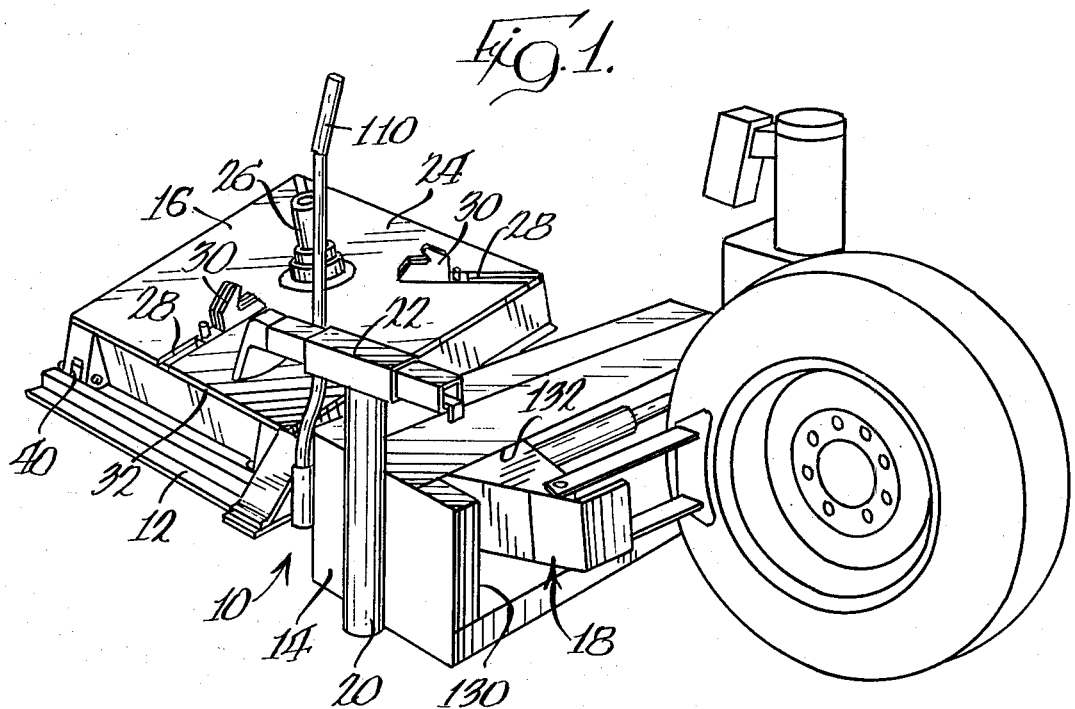
FIG. 1 is a perspective view of a tire changing apparatus made according to the invention.
Figure 2:
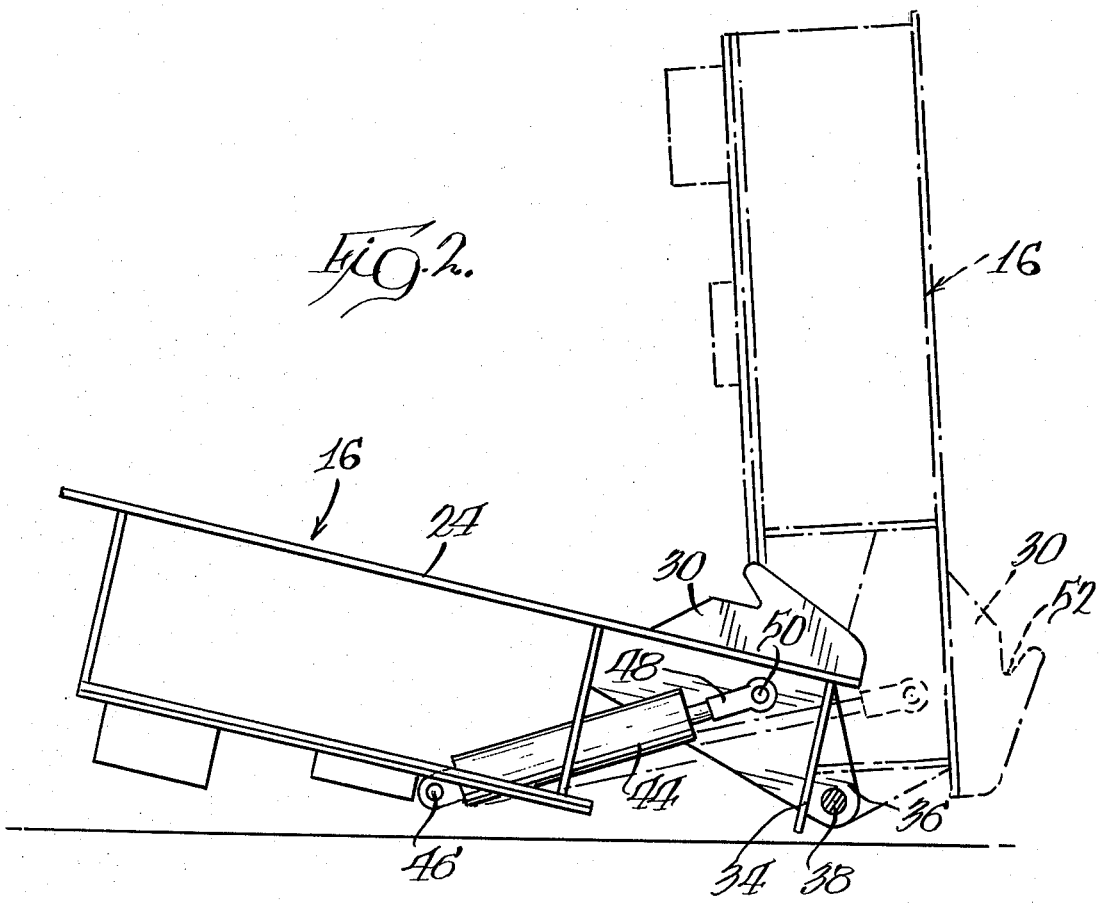
FIG. 2 is a somewhat schematic, elevational view of a tabletop employed in the invention.

With reference to FIGS. 1 and 2, an exemplary embodiment of a tire changing apparatus made according to the invention is illustrated and is seen to include a base, generally designated 10, which is adapted to support the apparatus on an underlying surface such as a floor or the like. The base 10 includes a rectangular frame 12 of low profile and a somewhat higher housing 14. The low profile frame 12 mounts a tire changing tabletop 16 while the housing part 14 of the base 10 mounts a bead loosening assembly, generally designated 18.

The assemblage also includes an upright, open-ended tube 20 which may receive a tire changing tool 22 when not in use for storage purposes.

The tabletop 16 includes a rectangular upper plate 24. Centrally, within the plate 24 is a tire tool receiving fixture 26 which can receive the tool 22 for purposes to be seen. Slots 28 at spaced locations in the plate 24 reciprocally guide tire securing clamps 30 toward and away from the fixture 26. In the preferred embodiment, there are three such clamps 30 each equally angularly spaced by about 120°.

One edge 32 of the plate 24 mounts a downwardly depending plate 34 (FIG. 2) which in turn mounts apertured tongues 36. Pivot pins 38 extend through the tongues 36 and corresponding lugs 40 (only one of which is shown in FIG. 1) on the frame 12 so as to mount the tabletop 16 for rotation about a generally horizontal axis.

As seen in FIG. 2, when the tabletop 16 is in a solid line position, it is disposed for a tire changing operation. When, however, the tabletop 16 is shifted to the dotted line position in FIG. 2, it is in a wheel loading and unloading position.

To provide for such movement, a fluid cylinder 44 is pivotally connected at 46 to an appropriate part of the frame 12 and has its rod 48 pivotally connected by a pin 50 to the tabletop 16.

As also can be seen in FIG. 2, the grippers 30 have radially inwardly opening notches 52 for the purpose of gripping the exterior of the rim of a wheel. One of the slots 28 is located such that its corresponding gripper 30 moves in a path generally transverse to the edge 20 which is parallel to the horizontal axis defined by the pivot pins 38. Thus, with the tabletop 16 in its vertical position as shown FIG. 2, the notch 52 of the associated rim clamp 30 will open upwardly. A wheel and tire, with the beads thereof previously loosened, may be rolled into proximity to the tabletop 16 such that the rim of the wheel overlies the notch 52. The grippers 30 may then be moved by means to be described hereinafter radially inwardly on the tabletop 16 and during such movement, the notch 52 on the lowermost gripper 30 will engage the rim of the wheel to elevate the wheel until such time as the remaining clamps 30 engage the rim at which time the wheel will be centered on the tabletop 16 about the fixture 26. This feature of the invention eliminates any need for the operator of the tire changer to elevate a wheel and tire combination to place the same on the table. It will be appreciated that clamps of the type having radially outwardly opening notches or the like for engaging the inner surface of the wheel rim can be used in lieu of those illustrated. In such a case, the clamps will be initially located at their radially innermost position with respect to the fixture 26 and move radially outwardly. In such a case, the grippers corresponding to the uppermost grippers 30 shown in FIG. 2 would serve to elevate the tire and center the same with respect to the fixture 26.

Figure 3:
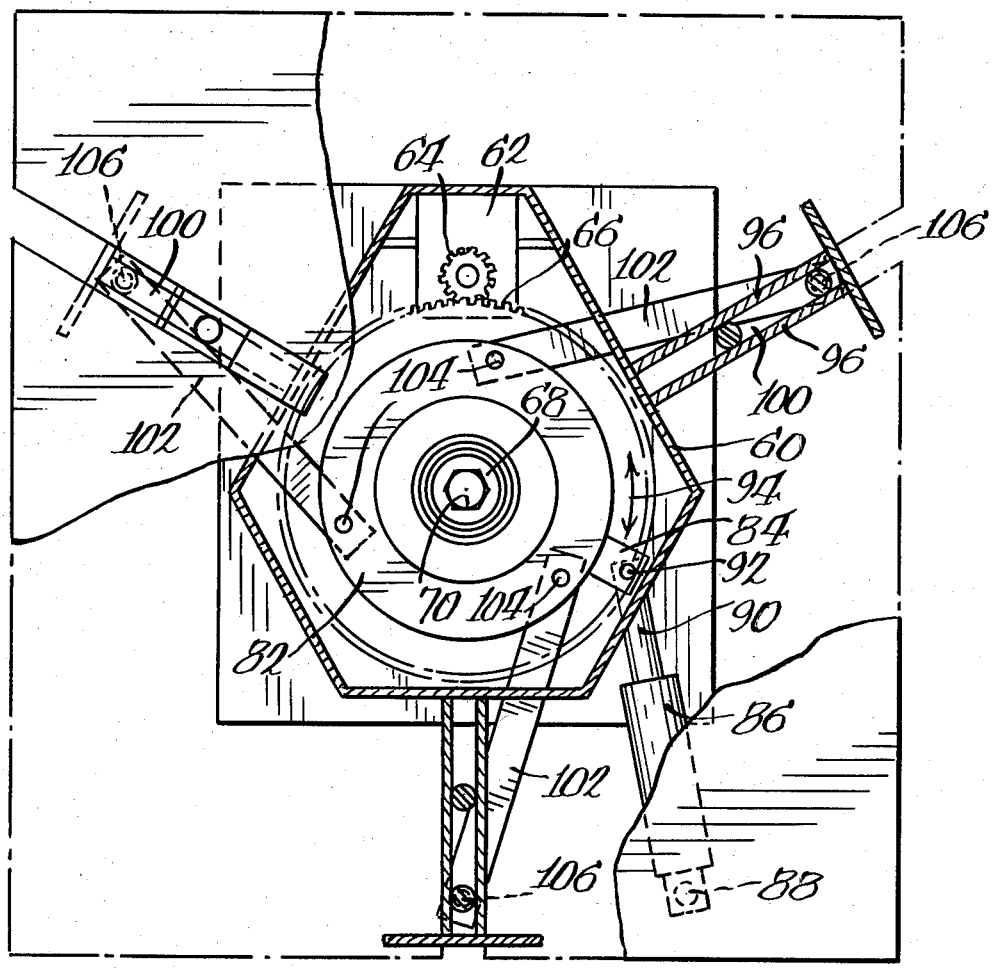
FIG. 3 is a plan view of the tabletop with parts broken away and other parts shown in section for clarity.

Turning now to FIG. 3, a housing like frame structure 60 is secured to the undersurface of the plate 24 and mounts a bidirectional motor 62 having a rotary output mounting a gear 64. The gear 64 is engaged with a rather large gear 66 which in turn is suitably rotatably journalled by bearings not shown and which drives a bushing 68 having a hexagonal interior 70. The bushing 68 forms part of the tool receiving fixture 26 and a tire changing tool may be received within the opening 70 to be rotated upon energization of the motor 62.

A disk 82 is also suitably journalled beneath the plate 24 concentrically with the gear 66 and includes a radially outwardly directed tab 84. A cylinder 86 is pivoted as at 88 to the tabletop and its rod 90 is pivoted as at 92 to the tab 84. Thus, by extension or retraction of the rod 90 through the direction of fluid to the cylinder 86, the disk 82 can be bidirectionally rotated as indicated by an arrow 94.

Plate-like guides 96 are aligned with the slots 28 and guide blocks 100 on which the grippers 30 are suitably mounted as desired. Links 102 are pivoted at 104 to the disk 82 and at 106 to the blocks 100. Thus, and with reference to FIG. 3, when the disk 82 is rotated in a counterclockwise direction, the blocks 100 will be moved radially inwardly causing a corresponding movement of the grippers 30. Conversely, when the disk 82 is rotated in a clockwise direction, ultimately, the grippers 30 will be moved radially outwardly.

It will be observed that this arrangement provides for simultaneous movement of the grippers 30 in the same direction and at the same rate to provide the aforementioned centering action. The use of the cylinder 86 to drive the clamps 30 ensures that the previously mentioned lifting function thereof for loading purposes requires no more effort on the part of the operator than that required to operate a suitable control for the cylinder 86.

Returning to FIG. 1, a control handle 110 extends upwardly from one side of the frame 12 and may be employed to operate suitable valving for control of the cylinders 44 (FIG. 2) and 86 (FIG. 3). The particular means utilized form no part of the present invention but it is contemplated that fore and aft movement of the handle 110 relative to a neutral position can be utilized to control the cylinder 44 for moving the tabletop 16 between the two positions shown in FIG. 2. Leftward movement of the handle could be used, for example, to cause the clamps 30 to move radially outwardly while rightward movement of the handle 110 could be used to cause radially inwardly movement of the grippers 30.

Figure 6:
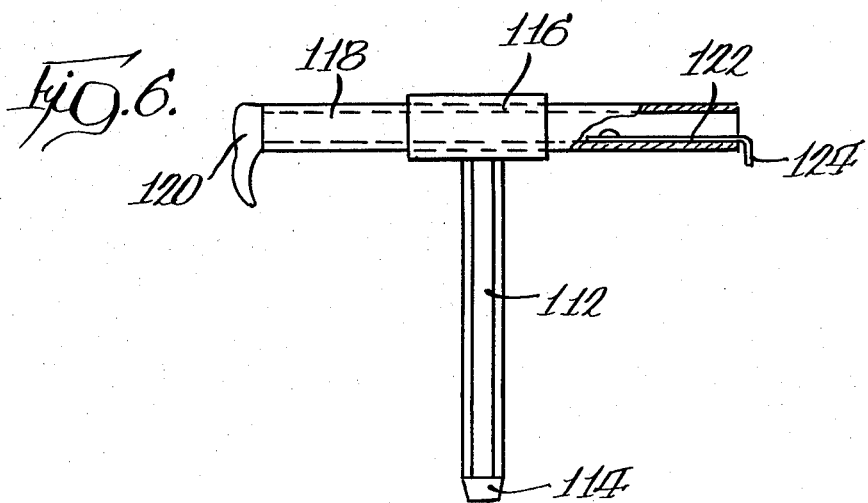
FIG. 6 is a view of a tire changing tool which may be used with the tire changer.

A typical tool to be used in conjunction with the fixture 26 is illustrated in FIG. 6 and includes a shaft 112 of hexagonal exterior configuration terminating in a bevel 114 for receipt within the bushing 68. The upper end of the shaft 112 is provided with a transversely extending sleeve 116 having a square internal cross-section to slidably receive a square tube 118. One end of the tube 118 mounts a tool head 120 which may be of any suitable configuration known in the art and which is enlarged sufficiently so as to be impassable through the sleeve 116.

The other end of the tube 118 mounts a spring finger 122 which extends exteriorly of the tube end 118 and which terminates in a tab 124 thereat. The tab 124 extends beyond the periphery of the tube 118 and is such as to normally engage the end of the sleeve 116 if it is attempted to remove the tube 118 therefrom. When removal is desired, the tab 124 may be moved upwardly as seen in FIG. 6 against the bias of the spring finger 122.

The foregoing structure provides for ready radial adjustment of the position of the head 120 for wheels of varying sizes. It also permits relatively rough treatment of the tool without concern for the components thereof becoming inadvertantly disassembled to become lost or to strike a person in the vicinity of the tire changer.

Turning now to FIGS. 1, 4 and 5, the bead loosener assembly 18 will be described in greater detail. As seen in FIG. 1, the housing part 14 of the base 10 includes an open side 130 remote from the tabletop 16. The upper surface of the housing 16 is also partially open as at 132 immediately adjacent the open side 130.

Within the housing 14 is a U-shaped structure 134 having an elongated bight 136 which is straight and which may be formed by a rectangular tube or the like.

The U-shaped member 134 includes legs 140 extending from opposite ends of the bight 136 towards the opening 130. At their ends, the legs 140 are pivoted by pins 142 to the housing part 14 of the frame 10 so as to mount the U-shaped element 134 for rotation within the housing about a generally horizontal pivot axis.

From FIG. 1, and the description that follows hereinafter, it will be seen that the pivot axis defined by the pins 142 is transverse, that is at right angles, to the pivot axis defined by the pins 38.

Two carriages 150 are slidably mounted on the bight 136 for movement towards and away from each other. As best seen in FIG. 4, each of the carriages 150 is defined by upper and lower plates 152 and 154 respectively suitably secured together and mounting rollers 156 on opposite sides of the bight 136. Thus, the carriages 150 may move with a relatively small amount of friction towards and away from each other.

A cylinder 158 is pivotally connected at 160 to the lefthand carriage 150 and has its rod 162 pivotally connected at 164 to the righthand carriage 150. Thus, by extending the rod 162, the carriages may be moved to their most spaced positions as illustrated in FIG. 5 while through retraction of the rod 162, they may be moved towards each other.

The plates 152 and 154 comprising each of the carriages 150 have a longer length than that of the legs 140 of the U-shaped member 134 so as to extend through the openings 130 and 132 in the housing part 14. At their ends remote from the bight 136 they mount facing bead loosening assemblies 170 and 172. Each of the assemblies 170 and 172 is comprised of a fixed shoe 174 and a movable, inner shoe 176. Each of the shoes 176 is pivoted at 178 to the supporting structure for the fixed shoe 174 so that they may move relative to the fixed shoes 174.

The shoe assembly 172 also mounts an outwardly extending stop 179 which is adapted to engage the rim of a wheel during a bead loosening process.

In use, a tire and wheel, in an upright position, is rolled into the space between the shoes 170 and 172. A handle 180 suitably secured to the U-shaped member 134 is moved so as to pivot the entire assemblage about the pivot axis defined by the pins 142 so as to bring the shoes 174 to a position transverse to a radius of the wheel and immediately adjacent the rim thereof. The cylinder 158 is then operated to retract the rod 162 by means of valving operated by a foot pedal 182. Initially, the fixed shoes 174 will engage the side walls of the tire immediately adjacent the rim and upon continued movement towards each other, friction will cause the movable shoes 176 to be directed inwardly to the space between the bead and the rim to fully loosen the same. It will be observed that since the connection of the cylinder 158 is between two movable parts of the structure, namely, the carriages 150, to initiate the process, the wheel need not be pecisely centered with respect to the space between the shoes 174. In this respect, operation of the bead loosener takes place with a self-aligning feature thereby requiring the operator only to roll the tire to the general space between the shoes 174 and not precisely locate it therein. Thus, operator effort is minimized.

A further feature of the invention is the fact that the U-shaped member 134, the carriages 150, the shoes 170 and 172, and the cylinder 158 are also constructed and arranged with respect to the pivots defined by the pins 142 such that the center of gravity, designated CG in FIG. 4, is immediately adjacent the pivot axis but slightly spaced therefrom in the direction of the bight 136. As a consequence, the adjustable part of the assembly required for adjustment to wheels of varying sizes is very nearly balanced so that only a minimal amount of force need be exerted on the handle 180 to appropriately position the same. At the same time, when force is removed from the handle 180, as will be the case when the device is not in use, the particular location of the center of gravity will cause the adjustable components to pivot about the pivot axis 142 toward the position illustrated in dotted lines in FIG. 4 without the need of springs or other biasing means. This automatically assures, with a minimum of mechanical components, that the floor space occupied by the bead loosener when not in use is minimized.

It will be appreciated from the foregoing description that all facets of tire changing and bead loosening require a minimum of physical effort on the part of the operator. Physical effort is further minimized by the unique orientation of the bead loosener 18 with respect to the tabletop 16. It will be recalled that the pivot axis for the tabletop 16 is transverse to the direction of movement of the bead looseners. This orientation minimizes the effort required on the part of the operator in moving the tire and wheel from the bead loosener to the tabletop. In particular, the path of movement of a tire and wheel to the proper position with respect to the bead loosener is parallel and only a short distance away from the path of movement of a tire and wheel toward the proper position with respect to the tabletop 16 when it is in a loading position. Thus, the main effort required on the part of the operator is merely rolling the tire in a relatively straight line with minimal pivoting of the tire about one of its diameters.

As a consequence, the efficiency of the tire changing process is maximized.

What is claimed is:

1. A tire changer comprising:
    a base having a lower extremity to support the base on an underlying surface;
    a table top having wheel securing means;
    means mounting said tabletop on said base for pivotal movement about a generally horizontal axis between a generally horizontal, tire changing position and a generally vertical, wheel loading and unloading position whereat said securing means is in sufficiently close proximity to the underlying surface supporting the base so as to be engageable with and securable to an upright wheel and tire on the underlying surface; and
    means for selectively pivoting said table top between said position.

2. The apparatus of claim 1 wherein said tabletop includes means defining a tire changing position to be occupied by a tire and wheel and there are at least three said wheel grippers, said motor means moving said wheel grippers such that the same grip a wheel and move it into said tire changing position.

3. A tire servicing apparatus comprising:
    a base having a low profile and adapted to be supported on an underlying surface;
    a table top for supporting a tire and wheel for changing and having an edge;
    means defining a horizontal pivot connecting said tabletop along said edge to said base so that said tabletop may be pivoted on said base between a substantially horizontal position for tire servicing and a substantially vertical position for loading and unloading;
    a motor for moving said tabletop between said positions;
    a tire tool mounting fixture in said tabletop and defining a wheel receiving position thereon; and a plurality of spaced wheel grippers mounted for simultaneous movement on said tabletop for movement generally towards and away from said fixture, said grippers being located so as to locate a wheel in said wheel receiving position when simultaneously moved to grip a wheel, and at least one of said grippers being located with respect to said pivot so as to lift a wheel and tire resting upright on the underlying surface relative to said tabletop when said tabletop is in said vertical position.

4. A bead loosener for loosening a tire from a wheel comprising:
   a base;
   a U-shaped support element having a straight bight and generally parallel legs extending therefrom;
   means pivoting said legs to said base for rotation of said U-shaped member about a generally horizontal axis;
   a pair of carriages mounted on said bight for slidable movement thereon towards and away from each other;
   a pair of bead loosening shoes, one on each carriage, and movable with their respective carriages for movement towards and away from each other; and
   a reciprocal motor extending between and interconnecting said carriages and operative to provide relative movement between the carriages.

5. The bead loosener of claim 4 wherein said carriages each extend from said bight past the end of said legs, and said bead loosening shoes are mounted on said carriages on the side of said pivoting means oppositely of said bight; said U-shaped element, said carriages, said bead loosening shoes and said reciprocal motor being constructed and arranged to have a center of gravity just to one side of said pivoting means in the direction of said bight whereby said U-shaped element, said carriages, said bead loosening shoes and said reciprocal motor are substantially balanced about said pivotal axis when a pivotal force is applied thereto by an operator of the bead loosener and yet will pivot under the influence of gravity towards a vertical position when not receiving a force from an operator of the bead loosener to reduce the floor space occupied by the bead loosener when not in use without the use of springs or other biasing means.

6. A bead loosener of claim 4 and further including a tire changing mechanism including a tabletop pivoted to said base for rotation about a second generally horizontal axis substantially transverse to said first mentioned generally horizontal axis for movement between a generally horizontal, tire changing position and a generally vertical wheel loading and unloading position, and wheel gripping means on said tabletop.

7. A tire changer for large tires comprising:
   a low profile frame having a lower extremity adapted to be supported by the underlying terrain and an edge whereat an upright tire and wheel may be disposed preliminary to a tire changing operation;
   a tabletop for receipt of a tire and wheel including means for clamping a wheel to the tabletop, said clamping means additionally comprising lifting means for lifting an upright tire and wheel at said edge to a clamping position on said tabletop;
   means mounting said tabletop on said frame for rotation about a generally horizontal axis closely adjacent to both said edge and said lower extremity and generally parallel to said edge between a generally vertical, tire and wheel receiving and discharging position and lower, non-vertical tire changing positions;
   means for rotating said tabletop about said axis; and
   means for effecting relative movement between a wheel clamped to said tabletop and a tire changing tool;
   whereby an upright tire may be rolled to said edge, clamped to said tabletop and then lowered to a tire changing position about a pivot axis well below the center of the tire and wheel to dispose the tire and wheel at an easily accessible position.

8. The tire changer of claim 7 wherein said table top is generally planar and has an edge parallel to said frame edge, said mounting means pivotally interconnecting said edges.

9. The tire changer of claim 7 wherein said relative movement effecting means comprise a rotatable tool drive carried by said table top.

10. For use in a tire changing or wheel servicing operation, an apparatus comprising:
    a base adapted to be disposed on underlying terrain and including a wheel supporting portion adapted to be substantially vertically disposed;
    a plurality of wheel clamps on said wheel supporting portion including at least one wheel clamp movably mounted thereon for relative movement toward and away from at least one other wheel clamp, each of said wheel clamps having at least one hook formation for gripping a wheel, said movably mounted wheel clamp being mounted for movement at a substantial angle to the horizontal and to a position sufficiently low relative to said base so a tire and wheel may be rolled upright on the tire tread on the underlying terrain on which said base may be disposed to said wheel supporting portion and said movably mounted wheel clamp hook formation may engage an upright wheel and lift the same into a tire servicing position on said wheel supporting portion; and
    means for moving said wheel clamp at said substantial angle;
    whereby an upright wheel or a wheel and tire may be both elevated and clamped in said tire servicing position solely by operation of said moving means.

11. The apparatus of claim 10 wherein said movably mounted wheel clamp moves substantially vertically.

* * * * *